United States Patent [19]

Nyfeler et al.

[11] 4,211,918
[45] Jul. 8, 1980

[54] METHOD AND DEVICE FOR IDENTIFYING DOCUMENTS

[75] Inventors: Alex Nyfeler, Baar; David L. Greenaway, Oberwil; Heinz Lienhard, Zug, all of Switzerland

[73] Assignee: LGZ Landis & Gyr Zug AG, Zug, Switzerland

[21] Appl. No.: 913,205

[22] Filed: Jun. 6, 1978

[30] Foreign Application Priority Data

Jun. 21, 1977 [CH] Switzerland ............... 7557/77

[51] Int. Cl.² .......................... G06K 7/10; G02B 5/18; G06K 19/00
[52] U.S. Cl. .............................. 235/454; 350/162 SF; 235/487
[58] Field of Search ............... 235/487, 454, 488, 457; 350/162 R, 162 SF, 151; 40/2.2; 283/7; 340/146.3 P, 149 A; 250/266

[56] References Cited

U.S. PATENT DOCUMENTS

| | | | |
|---|---|---|---|
| 2,735,617 | 2/1956 | Knutsen | 235/487 |
| 3,643,216 | 2/1972 | Greenaway | 340/146.3 P |
| 3,814,904 | 6/1974 | Russell | 235/487 |
| 3,873,813 | 3/1975 | Lahr | 235/487 |
| 3,919,447 | 11/1975 | Kilmer | 428/138 |
| 4,011,435 | 3/1977 | Phelps | 350/162 R |
| 4,014,602 | 3/1977 | Ruell | 40/2.2 |
| 4,020,278 | 4/1977 | Carre | 358/128 |
| 4,023,010 | 5/1977 | Horst | 350/162 R |
| 4,034,211 | 7/1977 | Horst | 350/162 SF |

Primary Examiner—Robert M. Kilgore

[57] ABSTRACT

A method and device for identifying documents. A multiplicity of machine-readable markings which characteristically modify incident light by diffraction or refraction are applied to the documents, and selected markings are then cancelled out, the remaining markings representing coded information. The markings are of at least two different kinds causing different modification of incident light, and are arranged in a characteristic configuration on the documents. Information about said configuration is stored in an identification device to permit checking of the remaining markings.

15 Claims, 11 Drawing Figures

Fig. 3 | A | A | A | A | B | B | B | B | C | C | C | C | D | D | D | D |

METHOD AND DEVICE FOR IDENTIFYING DOCUMENTS

BACKGROUND OF THE INVENTION

1. Field of the Invention

Documents such as identity cards, admission cards, credit cards, papers representing value, checks, travel tickets and the like, with machine-readable information, are known in many forms. Most documents presently used have coded information in the form of magnetic or optical markings, and can be forged at relatively low cost.

2. Description of the Prior Art

A very high degree of non-forgeability is achieved in a known machine-readable document which includes a hologram, which has the holographic image of a characteristic number which is coded in binary form by a given pattern of mutually demarcated spots of light. A hologram of this kind, which includes a coded characteristic number of authenticity data, can be relatively easily read and checked for authenticity by machine. On the other hand, the production of such a hologram requires expensive technical aids which are difficult to obtain, and well-founded technical knowledge, so that successful forgeries are only possible at extremely high cost. In a document with such a hologram, the characteristic number is produced thereon in the process of forming the holographic image of the pattern of spots of light—that is to say, at an early stage in the production process. This means that, for each document with which an individual characteristic number is to be associated, a respective particular hologram must be applied, and the individual characteristic numbers of a series of documents must be known to the producer of the holograms.

It has also already been proposed that a multiplicity of machine-readable optical markings which produce a characteristic modification of incident light by diffraction or refraction may be applied to a document, and selected markings may subsequently be cancelled, so that the geometric position of the markings remaining on the document represents coded information. This makes it possible for the coded information to be applied to the document in a very simple manner, while nonetheless retaining the advantages of storing the authenticity data in the form of light-modified markings. The authenticity of the markings can be checked and the coded information read with an optical reading device.

SUMMARY OF THE INVENTION

One object of the present invention is to provide an improved method of and apparatus for identifying documents.

Another object of the present invention is to provide a method of identifying a document bearing machine-readable optical markings which modify incident light by diffraction or refraction, said markings being of at least two different kinds.

According to the present invention there is provided a method of identifying documents, wherein a multiplicity of machine-readable optical markings which characteristically modify incident light by either diffraction or refraction are applied to the document and selected said markings on each document are subsequently cancelled out so that the geometric position of the markings remaining on the document represents a piece of coded information, and wherein the authenticity of said remaining markings is checked in an identification device and the coded information is read out, characterized in that at least two different kinds of said markings which cause a different modification of incident light are arranged in a characteristic configuration on the documents, in that information about said configuration is stored in the identification device, and in that checking is effected in the identification device as to whether the configuration of said remaining markings on the document to be identified coincides with said stored configuration.

The invention also provides apparatus for carrying out the method of the immediately preceding paragraph.

The above, and other objects, features and advantages of this invention will be apparent from the following detailed description of illustrative embodiments which is to be read in connection with the following drawings.

BRIEF DESCRIPTION OF THE DRAWINGS

FIG. 3 shows the information content of a storage means;

DESCRIPTION OF THE PREFERRED EMBODIMENTS

Figure 1:
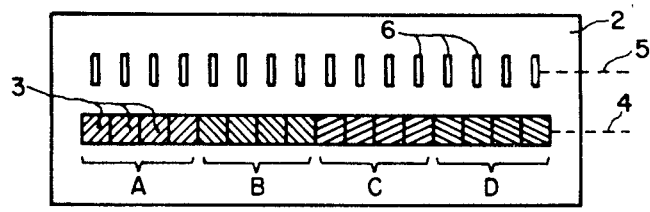
FIG. 1 shows a document with optical markings.

In FIG. 1, reference 2 denotes a document, which may be an identity card, an admission card, a credit card, a paper representing value, a check, a travel ticket or the like. A multiplicity of machine-readable markings 3 are applied to the document 2. Each of the markings 3 occupies on the document 2 a storage position for a data bit and causes a predetermined characteristic modification in the path of the light beam of an optical checking device (described in greater detail hereinafter), by diffraction or refraction of the reflected or transmitted light beam, and represents information with respect to authenticity which is difficult to forge. The markings 3 are not all of the same kind. In the illustrated embodiment, the document 2 has four different kinds (A, B, C and D) of markings 3, which are indicated in the drawing by different hatchings and which cause different modification of incident light. The four different kinds A, B, C and D of markings 3 are arranged on the document 2 in a characteristic configuration. In the FIG. 1 embodiment, the markings 3 constitute respectively four markings of the same kind arranged one after the other, disposed in a row configuration:

AAAABBBBCCCCDDDD

This row represents a data track 4. Parallel to the data track 4 is a timing track 5 which preferably contains optical timing markings 6.

The markings 3 and the timing markings 6 are preferably phase structures such as phase diffraction gratings, holograms, kinoforms or the like, which can be applied to the document 2 by an embossing process; in this case the document 2 comprises thermoplastic material or may be coated with a thin thermoplastic layer. This permits economical mass production of identical documents 2 which do not yet contain any individual information.

Figure 2:
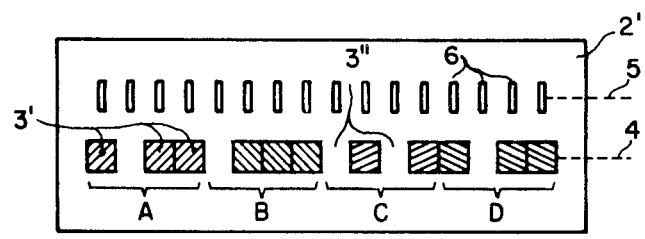
FIG. 2 shows the document of FIG. 1 with partially cancelled markings.

As shown in FIG. 2, coded information is applied to the document, indicated by reference 2' in FIG. 2, by cancelling out selected markings 3''. The term "cancelling out" is intended throughout this specification to mean that the markings 3'' are either completely erased or are so altered that they no longer cause the same characteristic modification of incident light as the remaining markings 3'. Cancelling out the markings 3'' can be effected, for example, by thermal, chemical or mechanical action. The code used in this operation is advantageously so selected that the coded information cannot be varied in a meaningful manner by unauthorized cancellation of further markings 3'. In the embodiment illustrated, the remaining markings 3' are arranged in the configuration:

A—AA—BBB—C—CD—DD wherein "—" denotes an intermediate space produced by cancelling a marking 3''.

If a binary "1" is associated with a remaining marking 3', and a binary "0" is associated with a cancelled marking 3'', the word:

1011011101011011 is stored in the data track 4.

As illustrated in FIG. 3, information about the configuration in which the different kinds A, B, C and D of markings 3 were arranged on the document 2 is stored in a storage means of the identification device. This can be effected for example by the sequence:

AAAABBBBCCCCDDDD of the different markings 3 being written in storage cells of the storage means, which cells can be read in serial manner.

Upon identification of the document 2', a check is performed in the identification device as to whether the configuration of the markings 3' remaining on the document 2' coincides with the stored configuration. In the embodiment illustrated, this can be checked by comparing the sequence of the markings 3' remaining on the document 2', with the sequence stored in the identification device. If these two sequences coincide, the document 2' is considered as being authentic and appropriate to the apparatus, and the coded information is read out and further processed, whereas if there is not coincidence between the two sequences, the document 2' is rejected.

The markings 3 of the same kind A, B, C or D, which are directly adjacent each other in the embodiment of FIG. 1, can obviously merge one into each other without any joint or seam. This means that for example the markings 3 of kind A, which lie adjacent each other, can be formed by a single phase diffraction grating embossed into the document 2, with a predetermined portion of such grating associated with each marking 3 of kind A.

Figure 4:
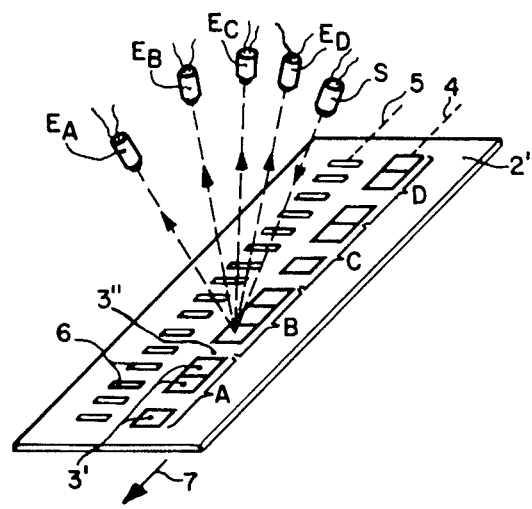
FIGS. 4 and 5 show views of the principal optical parts of an identification device.
Figure 5:
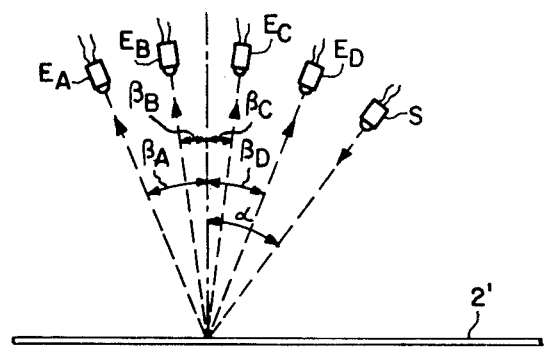

An embodiment of an identification device for documents 2 is described hereinafter with reference to FIGS. 4 to 6, the markings 3' of the document being reflecting phase diffraction gratings. By way of example, it is assumed that the lines of the gratings are oriented perpendicularly to the direction of the data track 4, and that the individual kinds A, B, C and D of these gratings differ by their line density N (lines per unit length). A light source S and four light receivers $E_A$, $E_B$, $E_C$ and $E_D$ are arranged in a plane perpendicular to the lines of the gratings and to the surface of the document 2' (FIGS. 4 and 5). The light source S emits a light beam which falls onto the document 2' through a mask (not shown), and on the document 2' illuminates a region of the data track 4 which corresponds to the outer dimensions of the markings 3'. The document 2' is moved in the direction of arrow 7 and the markings 3' are read out in a serial manner. If the light beam which falls on the document 2' at an angle of incidence $\alpha$, of a wavelength $\lambda$ which is in the visible or invisible wavelength region, falls on a marking 3', it is split up at the marking 3' into the individual diffraction orders. With respect to the angle of deflection $\beta$ of the partial beam which is reflected at the markings 3' into the high-energy first diffraction order, the following relationship applies:

$$\sin \beta = N\lambda - \sin \alpha$$

The light receivers $E_A$ to $E_D$ are arranged at the spatial angles $\beta_A$, $\beta_B$, $\beta_C$, and $\beta_D$ which are determined in accordance with this relationship. When a marking 3' of kind A is optically sensed, the light receiver $E_A$ is therefore energized; when a marking of kind B is sensed, the light receiver $E_B$ receives a signal; and so on. If on the other hand a respective region of the document 2' which is interrogated, does not have any marking 3' of the kind A, B, C or D, none of the light receivers $E_A$ to $E_D$ receives a signal which is of sufficient strength to energize the circuits connected to the light receivers. In addition, the absence of a marking 3' can also be demonstrated with at least one light receiver (not shown) which is arranged for example in the zero diffraction order of the diffraction gratings.

Figure 6:
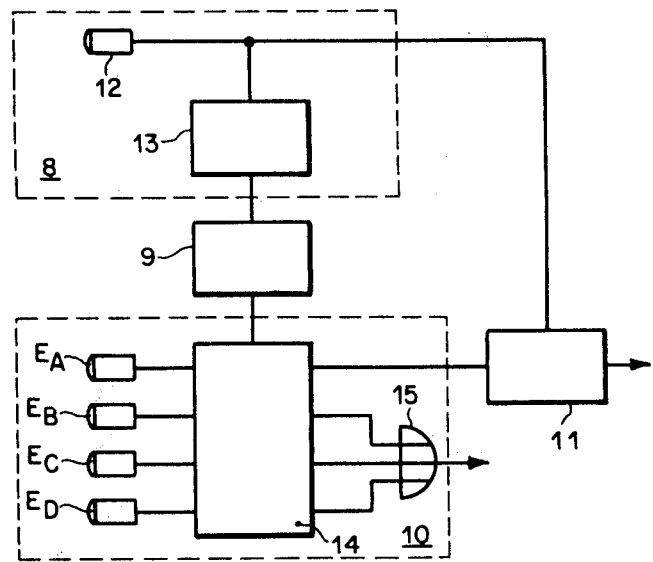
FIG. 6 shows a block circuit diagram of an identification device.

The identification device shown in FIG. 6 comprises a sensing means 8, an electronic storage means 9, a checking means 10 and an evaluation means 11. The sensing means 8 is provided to sense the local position of the marking 3' which is sensed at a given moment by the checking means 10, and to interrogate the storage position in the storage means 9, which corresponds to said local position. In the device illustrated, the sensing means 8 comprises an optical timing receiver 12 and a timing counter 13. The timing receiver 12, which is not shown in FIGS. 4 and 5 for the sake of simplicity of the drawing, senses the timing markings 6 of the document 2'. Each timing marking 6 causes the counter 13 to be switched forward by one position, and thus causes interrogation of the next storage position of the storage means 9 connected to the counter 13. As shown in FIG. 3, information about the configuration of the different kinds A to D of markings 3 is stored in the storage means 9.

The checking means 10 comprises the light source S (not shown in FIG. 6), the light receivers $E_A$ to $E_D$, a comparison means 14 controlled by the storage means 9, and an OR-gate 15. Depending on the information content of the respective storage cell of the storage means 9, which is interrogated by the counter 13, the comparison means 14 connects one of the light receivers $E_A$ to $E_D$ to the evaluation means 11 and the other three light receivers to the three inputs of the OR-gate 15. In the example considered here, the light receiver $E_A$ is connected by way of the means 14 to the evaluation means 11, if the first four storage positions of the document 2' of the data track 4 are interrogated; when the next four storage positions are interrogated, the light receiver $E_B$ is connected to the evaluation means 11, and so on. The checking means 10 is thus controlled by the storage means 9 in such a way that the checking means 10 supplies a respective signal to the evaluation means 11 whenever a marking 3' scanned by the checking means 10 produces a modification of the light from the light source S, such modification being characteristic of the kind A to D of that marking 3, whose stored configuration coincides with the configuration of the scanned marking 3'. In the event of coincidence, the coded information is read into the evaluation means 11 which is controlled by the receiver 12, but in the event of non-coincidence, the OR-gate 15 responds and supplies an error signal.

The above-described identification device has, for each kind A to D of marking 3 a single light receiver $E_A$ to $E_D$ which is arranged in the first diffraction order. Reliability of identification can be further increased if a group or row of light receivers is provided for each kind A to D of marking 3, which light receivers are arranged in different diffraction orders and are connected to a decision logic means which provides an authenticity signal when the energy components in the diffraction orders occupied with light receivers are in a predetermined relationship relative to each other.

Instead of diffraction gratings, as already mentioned above, for example holograms may be applied to the document 2, as the markings 3. Phase holograms are particularly suitable in this respect, which represent the holographic image of a pattern of spots of light, which split up the reading light beam into a plurality of partial beams in the identification device, and which deflect such partial beams in predetermined directions, where they are detected with light receivers.

As was described above with reference to the example of the diffraction gratings, the individual kinds A to D of markings 3 may differ by their structure. Another possible alternative is for the different kinds A to D of markings 3 to have a structure which is identical but which is differently oriented. In the last-mentioned case, the authenticity of the markings 3' remaining on the document 2' can also be checked in the identification device by light receivers which are arranged in given angular positions corresponding to the particular light-modifying action of the individual kinds of markings 3. When the markings 3 are in the form of diffraction gratings, the different kinds A to D of markings 3 may differ from each other both by their line density and also by the orientation of the lines.

The different kinds A to D of markings 3 can also be detected with a single light receiver if this light receiver is not arranged rigidly in the identification device, but is arranged movably corresponding to the light-modifying action and the characteristic configuration of the different kinds A to D of markings 3. This is particularly advantageous when the markings 3 are phase diffraction gratings which are arranged in a row and whose line density and/or whose line orientation varies along the row continuously or quasi-continuously (that is to say, with a very slight alteration in the line density or orientation from one marking to the next adjacent marking).

Figure 7:
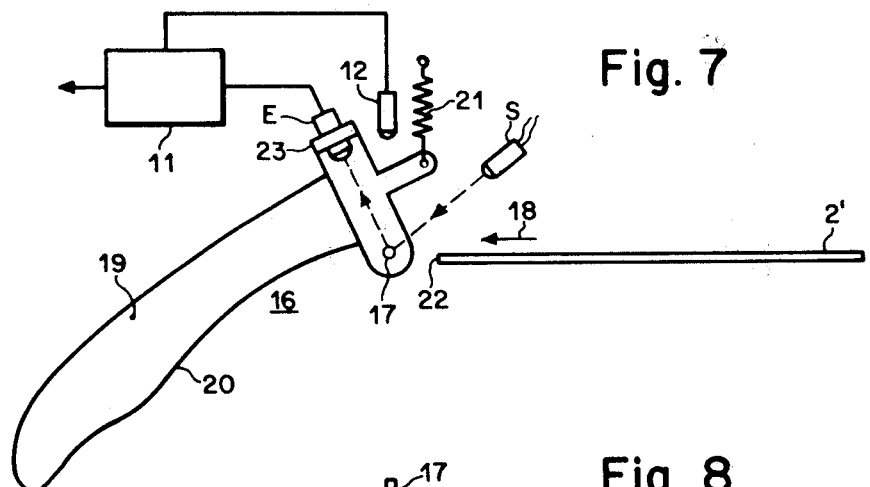
FIG. 7 shows a side view of parts of an identification device.
Figure 8:
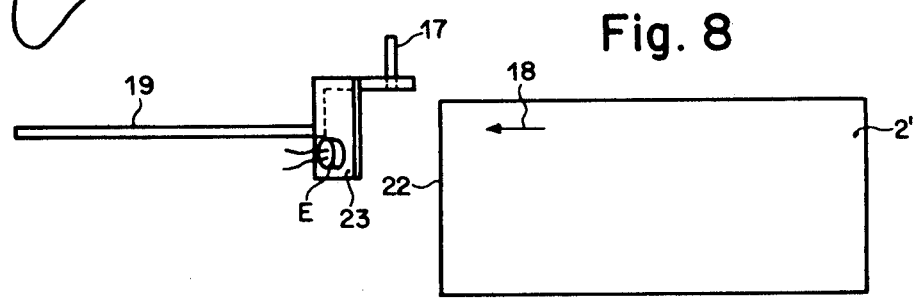
FIG. 8 shows a plan view of parts of the identification device as shown in FIG. 7.

FIGS. 7 and 8 show an embodiment of such an identification device.

In FIGS. 7 and 8, reference numeral 16 denotes a cam lever mounted pivotally on a mounting pin 17. The document 2' to be identified is moved in the direction of an arrow 18 in a guide path (not shown) or on a carriage, by hand or by means of a drive, the surface of the document 2' to be checked and the axis of the mounting pin 17 lying in a common place. The lever 16 has a cam arm 19 whose cam-shaped edge 20 is pressed against a forward edge 22 of the document 22' by the action of a spring 21. The forward edge 22 slides along the edge 20 and thereby actuates the lever 16 in accordance with a function determined by the cam shape of the edge 20. In accordance with this function the spatial angle at which a light receiver E is arranged is varied, the light receiver E being rigidly secured on an arm 23 of the lever 16. The optical axis of the light source denoted again by reference S in FIGS. 7 and 8, the optical axis of the light receiver E and the axis of the mounting pin 17 intersect at a point on the data track 4 (FIG. 2) of the document 2'. A screen (not shown) is also provided to ensure that only a respective region of the data track 4, which corresponds to the outer dimensions of the markings 3', is illuminated and detected. The light receiver E and the receiver 12 which scans the track 5 (FIG. 2) are connected to the evaluation means 11.

The configuration of the edge 20 of the lever 16 is so selected that the light beam reflected by a marking 3' impinges on the light receiver E when that marking causes the same modification of the light emitted by the light source S, as the corresponding marking 3 originally applied to the document 2. It will be readily seen that the lever 16 operates both as a storage means for storing a piece of information about the characteristic configuration and as a sensing means for sensing the local position of the respective markings 3' being sensed.

The storage means may also be formed by a cam plate which is arranged on a carriage transporting the document 2'. In this case the cam plate is sensed with a sensor, for example, a sensing pin which bears on the cam plate against the force of a spring, the cam plate varying the angular position of the light receiver with the sensor. This makes it possible for the cam shape to be of a greater number of configurations, in comparison with the arrangement shown in FIGS. 7 and 8.

It will be understood that, with the cam lever 16 or with the above-mentioned cam plate, the angular position of the light receiver E may be varied not only in a plane parallel to the direction of movement of the document 2' but also for example in the plane perpendicular to the direction of document movement. If the cam plate is of a suitable configuration, a three-dimensional change in the position of the light receiver is also possible. In addition, in the above-described manner it is also possible to vary the positions of a plurality of light receivers with which holograms or kinoforms can be established, these being arranged in at least one row and their structure or orientation varying in a quasi-continuous manner along the row.

The characteristic configuration of the different kinds A to D of the markings 3 on the document 2 may characterize a given identification system and the coded information represented by cancelled markings 3" and remaining markings 3' may characterize a given document 2' of the identification system. If for example, only two kinds of marking 3 are used, and in total N markings are applied to the document 2, thus $2^N$ different documents and accordingly also $2^N$ different identification devices may be distinguished. The invention therefore opens the way to an enormous diversity of systems.

If it is desired that the coded document should still contain all the information about the characteristic configuration in which the different kinds of markings were arranged, then in accordance with a further embodiment, two markings 3 of the same kind are associated with each bit of the coded information. When coding the document, at most one of these two markings is cancelled out. This is described hereinafter with reference to an example.

Figure 9:
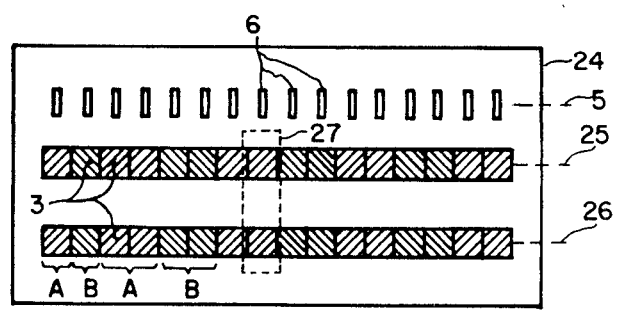
FIG. 9 shows a further document.
Figure 10:
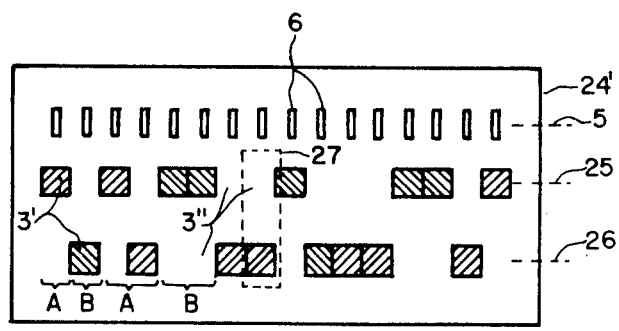
FIG. 10 shows the document of FIG. 9 with partially cancelled markings.

FIG. 9 shows a document 24 whose markings 3 of kinds A and B are arranged in two parallel rows in identical configurations, and form two data tracks 25 and 26. The timing track 5 with the markings 6 is disposed parallel to the tracks 25 and 26. Two markings 3 of a pair of markings 27 are associated with each bit of coded information to be applied to the document 24, namely, one marking 3 being associated with the track 25 and the corresponding marking line below the first-mentioned marking 3 being associated with the track 26. The coded information is preferably written in by cancellation of a marking 3 of the respective pair of markings 27, in the upper track 25 or in the lower track 26 respectively. FIG. 10 shows the document 24' coded in this manner, with remaining markings 3' and cancelled markings 3''.

It will be readily seen that the coded document 24' still contains all the information about the characteristic configuration in which the kinds of markings A and B were originally arranged. A further advantage of this coding method is that the coded information may not be varied in a meaningful manner by cancellation of further marking 3', as this would mean that the second marking of the pair of markings 27 would also be cancelled. Therefore, a parity check may also be carried in a simple manner on the document 24'.

Figure 11:
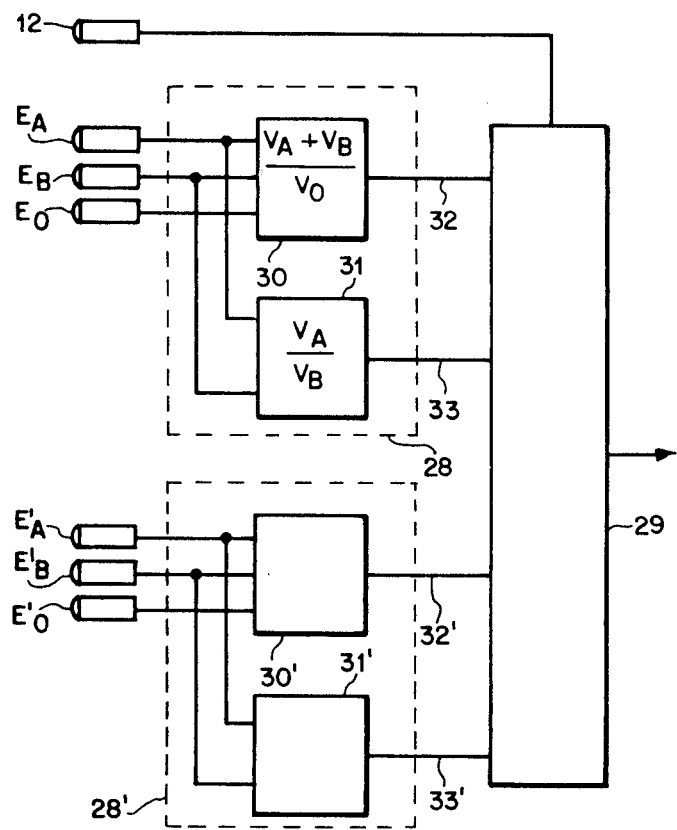
FIG. 11 shows a block circuit diagram of a further identification device.

The identification device shown in FIG. 11 comprises light receivers $E_A$, $E_B$ and $E_O$ for sensing the data track 25, light receivers $E_A'$, $E_B'$, and $E_O'$ for sensing the track 26, the timing receiver 12, detection logic means 28 and 29 connected respectively to the light receivers $E_A$, $E_B$ and $E_O$ and to the light receivers $E_A'$, $E_B'$ and $E_O'$, a processing logic means 29, and one or more light transmitters (not shown).

By way of example, it will also be assumed that the markings 3' (FIG. 10) are phase diffraction gratings and the light receivers $E_A$, $E_B$, or $E_A'$ and $E_B'$ are arranged in an angular position corresponding to the first diffraction order of the diffraction gratings. The radiation intensity in the zero diffraction order is detected by the light receivers $E_O$ and $E_O'$. The detection logic means 28 and 28' receives signal ratio checking members 30 and 31, 30' and 31' respectively, whose outputs 32 and 33, 32' and 33' respectively are connected to the evaluation logic means 29. The receiver 12 is also connected to the evaluation logic means 29 which substantially comprises a micro-processing unit.

The checking member 30 or 31' respectively forms the signal ratio:

$$(V_A+V_B/V_O)$$

and the checking member 31 or 31' forms the signal ratio:

$$(V_A/V_B)$$

wherein $V_A$ represents the signal of the light receiver $E_A$ or $E_A'$, $V_B$ represents the signal of the light receiver $E_B$ or $E_B'$, and $V_O$ represents the signal of the light receiver $E_O$ or $E_O'$. When the document 24 is serially scanned, signals which represent the bit sequence of the corresponding data track 25 and 26 respectively are produced at the outputs 32 and 32'. The signal at the output 33 or 33' indicates whether the respective bit in question is represented on the document 24' by marking 3' of kind A or of kind B. The processing logic means 29 checks whether the configuration stored therein coincides with the configuration of the kinds A and B or markings 3, and, if it does so, the means 29 delivers a signal and further processes the coded information.

The above-described evaluation of the signal ratios can provide for particularly reliable checking with respect to authenticity and identity, even in the event of a very small useful signal-to-noise signal ratio. In the manner described with reference to FIG. 9, with only two different kinds A and B of markings 3, it is possible to provide $2^N$ different documents 24. As shown in FIG. 10, $2^N$ different pieces of coded information can be entered on each of those documents.

The number of pieces of coded information which can be distinguished can be further increased if not just two but three bit conditions are permitted for a pair of markings 27 (FIG. 10), namely a remaining marking 3' in the data track 25, a remaining mark 3' in the data track 26, and finally a respective remaining marking 3' in both data tracks.

The arrangement of the two markings 3' of a pair of markings 27 on two separate data tracks 25 and 26 makes it possible to achieve particularly simple signal processing. Obviously, it is also possible for the two markings 3' of a pair of markings 3' to be arranged on the same track.

The most important advantages of embodiments of the invention will now be summarized once again. As different kinds of markings which cause different modification of incident light are applied to the document in a characteristic configuration, the safeguards against forgery are extremely high. Also, the number of different possible codings is very greatly increased by this means. Nevertheless, it is possible for identical documents in which the configuration of the different kinds of markings may characterize a given identification system to be mass produced economically, and subsequently to be provided with individual information by cancellation of selected markings. The documents are checked with respect to authenticity and identified in a simple reliable manner in the identification device, and forged documents or documents which are foreign to that system and whose markings are not arranged in the pre-determined characteristic configuration, are rejected.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method of identifying documents, comprising applying to the documents a multiplicity of machine-readable optical markings which characteristically modify incident light by either diffraction or refraction, wherein at least two different kinds of said markings which cause a different modification of incident light are arranged at least in pairs in a characteristic configuration on the documents, whereby said configuration is the same for all documents, storing information about said configuration in an identification device, cancelling out selected said markings on each document whereby at least one of the markings of the same kind is not cancelled, the geometrical position of the markings remaining on the document representing a piece of coded information, checking that the configuration of said remaining markings on the document coincides with the configuration information stored in the identification device, and if so, reading out said coded information.

2. A method according to claim 1 wherein said markings applied to the document are phase diffraction gratings, and the individual kinds of said markings differ by the line density and/or the line orientation of the lines of the phase diffraction grating.

3. A method according to claim 1 wherein said markings applied to the document are either holograms or kinoforms.

4. A method according to claim 2 wherein the phase diffraction gratings are arranged in at least one row and the line density and/or the line orientation varies along the row.

5. A method according to claim 3 wherein said markings are arranged in at least one row and their structure and/or their orientation varies quasi-continuously along the row.

6. A method according to claim 1 wherein two said markings of the same kind are associated with each bit of the coded information and at most one of said two markings is cancelled out.

7. A method according to claim 6 wherein said markings are arranged in two parallel rows with identical configuration.

8. An apparatus for identifying documents, said documents having contained a multiplicity of machine-readable optical markings which characteristically modify incident light by either diffraction or refraction, said markings being of at least two different kinds each causing a different characteristic modification of incident light, and said markings being arranged at least in pairs in a characteristic configuration on the documents, whereby said configuration is the same for all documents, selected said markings having subsequently been cancelled whereby at least one of the markings of the same kind is not cancelled, the geometrical positions of the markings remaining on the document representing a piece of coded information, comprising:

checking means for serially checking the authenticity of said remaining markings, said checking means comprising at least one light source and at least one light receiver; and a storage means in which information about said characteristic configuration is stored, said checking means being controlled by said storage means in such a way that said checking means supplies a signal whenever a said marking scanned by said checking means causes a modification of the light emitted by said light source, which modification is characteristic for the kind of that marking, whose stored configuration coincides with the configuration of the scanned marking.

9. Apparatus according to claim 8 further comprising a sensing means connected to said storing means for sensing the local position of the respective said marking scanned by said checking means.

10. Apparatus according to claim 9 wherein said storage means is an electronic storage means, said sensing means comprises an optical timing receiver and a timing counter, and said checking means has a plurality of light receivers connected to an evaluation means by way of a comparison means controlled by said storage means.

11. Apparatus according to claim 10 wherein for each kind of different said marking, a light receiver is arranged in an angular position corresponding to the characteristic light modification of said respective kind of marking.

12. Apparatus according to claim 9 wherein said sensing means and said storage means are formed by a cam lever, and the angular position at which said light receiver is arranged can be influenced by said cam lever.

13. Apparatus according to claim 11 wherein said storage means is formed by a cam plate which is arranged on a carriage for transporting the document and can be sensed with a sensing means, and the angular position at which said light receiver is arranged can be influenced by said sensing means.

14. Apparatus according to claim 8 wherein said checking means is formed by at least one detection logic means and a processing logic means, the detection logic means has signal ratio checking members for checking signal ratios from the signals of the light receivers, and the processing logic means includes a micro-processing unit.

15. Apparatus according to claim 8 further comprising at least one light receiver for establishing the absence of a said marking.

* * * * *